Patented Dec. 16, 1952

2,622,084

UNITED STATES PATENT OFFICE 2,622,084

ISOLATION OF PIPERAZINE

Thomas W. Clapper, Idaho Falls, Idaho, and Robert C. Kinstler, South Bound Brook, N. J., assignors to American Cyanamid Company, New York, N. Y., a corporation of Maine No Drawing. Application November 2, 1951, Serial No. 254,642

4 Claims. (Cl. 260—268)

The present invention is concerned with piperazine, and is a continuation-in-part of application Serial No. 120,407, filed October 8, 1949. More particularly, the present invention is concerned with the preparation of piperazine. Still more specifically, it is concerned with the isolation of substantially anhydrous piperazine, formed as one of the components of the mixture obtained in the preparation of commercial ethylene amines.

Commercially, the only available supply of piperazine is the minor fraction of it which is formed as a by-product in the preparation of ethylene amines. In addition to the piperazine, such mixtures contain a number of varied additional substituents. These may include, for example, ethanol amines such as monoethanol amine, diethanol amine, ethylene diamine, and polyethylene polyamines such as diethylene triamine, triethylene tetramine, and the like. The reaction mixture is distilled to recover the polyethylene amines and the still bottoms or residue may contain from about 10 percent to 47 percent piperazine, depending upon the conditions of fractionation. This residue may be further fractionated to give ethylene diamine, collected up to 125° C.; piperazine, B. P. 125–165° C.; monoethanol amine, B. P. 165–185° C. and diethylene triamine which will distill over at 185–215° C. In addition, the residue contains an appreciable amount of dark-colored polymerized amines that will not distill at atmospheric pressure without decomposition.

Piperazine itself is a solid, melting at 104° C. and boiling at 145° C. when pure. Most of the other constituents of commercial mixtures of "ethylene" amines, such as those noted above, are ordinarily liquids. It would, therefore, be presupposed that effective separation could be fractional distillation. In the past, most attempts at isolation of the piperazine content of such mixtures have been by way of fractional distillation.

Unfortunately, in actual practice, such procedures have been formed to be both troublesome and expensive. The range between its melting point and boiling point is narrow. This fact is responsible for product solidifying in condensers, receivers and the like, often plugging the system and causing a hazardous situation. Further, piperazine is soluble in many of the amines present in commercial mixtures of ethylene amines, and forms azeotropic mixtures therewith. Due to a combination of these factors, such fractional distillation methods, therefore, are not wholly satisfactory.

As a result, there remains in this field a well developed but unsatisfied demand for a suitable process of separating the piperazine content from the remainder of the so-called ethylene amines mixtures. It is, therefore, the principal object of the present invention to provide such a process. Preferably, such a process should be capable of producing the piperazine yield in high purity, in a simple, economical, and readily-carried-out process. Preferably, too, the process should not involve any unnecessary or unusual apparatus, nor require excessive care in its handling.

Surprisingly, in view of the demand in the art, and the previous failures to meet it, the principal objects of the present invention have been fully met in a relatively simple and straightforward process. Broadly speaking, the process consists in fractional crystallization of substantially anhydrous piperazine at low temperatures. A preliminary concentration, up to a 20–40% piperazine content, may be accomplished by distillation.

In the following discussion and claims where an ethylene amines mixture is recited, reference is had to the commercially available mixtures discussed above, containing ethanol amines, ethylene diamine and polyethylene polyamines. The composition of these commercial mixtures vary slightly, because their production methods are not wholly uniform in results. They usually contain from about 10 percent up to more than 40 percent of piperazine. In addition to these substituents, there is usually present more highly condensed amines, and, in some cases, products which appear to be polymerization products of the amines.

It is belived that the invention may be more readily understood with reference to certain illustrative examples which are given below. These examples are by way of illustration only and are not by way of limitation. In the illustrative examples all parts are considered to be by weight, unless otherwise specified.

In order to show the effect the fractional crystallization on a commercial crude mixture, the follouing experiment was carried out. When the range over which commercial ethylene amines mixtures vary in piperazine content is considered, it will be seen that the results so obtained in accordance with the process of this illustrative example, are highly useful.

Example 1

From a crude mixture of commercial, mixed ethylene amines, a portion comprising 1100 parts was seeded with anhydrous piperazine crystals and the mixture stored overnight at 0° C. Subsequently, the resultant slurry was subjected to centrifugal separation. 115 parts of substantially anhydrous piperazine crystals (or about 10.5% of the original portion) was obtained.

*Example 2*

A sample of slurry of partially concentrated commercial ethylene amines mixture containing solid piperazine and having a piperazine content of about 40 percent, was allowed to stand until the solids content thereof substantially settled. 800 parts of supernatant liquid was drawn therefrom. This liquid was then simply distilled until the vapor temperature reached 180° C. The distillation residue was cooled to 0° C. No crystallization was obtained, showing the piperazine content of the original liquid, if any, to be in the distillate. The latter was cooled to about 3° C. and the resultant heavy slurry subjected to centrifugal separation. 53 parts of anhydrous piperazine crystals, amounting to about 6.6% by weight of the original liquid, was obtained.

From the foregoing examples, it can be readily seen that the process of the present invention results in surprisingly effective, although simple, separation. It is necessary only to subject the ethylene amines mixture containing piperazine to a low temperature for a short time. When the resultant crystallization substantially ceases, the crystals may be collected in any desired manner. This may be by centrifugal separation, filtration, or the like.

Although a low temperature is found to be preferable, it is not commercially necessary to utilize temperatures below about 0° C. Temperatures up to about 10° C. are satisfactory. At temperatures appreciably above 10° C., the crystallization tends to be either undesirably slow or incomplete. Temperatures from about 0–5° C. being readily obtainable by means of an ice bath, this forms one simple method of attaining the desired temperature.

In many cases the liquor to be subjected to the cold-crystallizing operation will be a slurry or will, at least, contain some solid piperazine. If not, it is desirable to provide seed crystals. This is of definite assistance in increasing both the rate and extent at which crystallization is to be expected. Only a small amount is required.

As noted from the examples, it is not necessary to subject the whole original slurry to the cold crystallizing step. The commercially-obtainable mixture is usually in the form of a slurry. The solids content can be separated by settling, centrifugal separation, or the like, leaving only the relatively clear liquor to be treated.

In Example 2 above, the original mixture after being freed from solids, was distilled. This is a desirable but not an essential step. The commercial mixtures contain high-boiling constituents as indicated above. These may be eliminated by distilling the mixture up to a temperature slightly above the boiling point of piperazine. About 180° C. is a good practical limit for this operation. This distillate is then subjected to the cold crystallizing operation of this invention.

One of the principal utilizations of piperazine is in the preparation of substituted products in the manufacture of drugs and dyestuffs. As an initial step in this operation, the piperazine is often dehydrogenated to pyrazine. One of the more effective methods of accomplishing the latter is in the vapor phase. For this reaction, anhydrous piperazine is a good starting material.

Liquid remaining after the treatment of the present invention is relatively low in piperazine content. It is readily concentrated by distillation up to the 20–40% piperazine content at which distillation becomes impractical as noted above. By a circulation system of distillation, cold crystallization, distillation, etc., substantially the entire piperazine content of any available piperazine-containing ethylene amines mixture may be separated and recovered as crystals.

We claim:

1. A method of isolating in anhydrous form the piperazine content of commercial mixtures of ethylene amines containing piperazine, ethylene diamine, ethanol amine, and polyethylene polyamines, which comprises: subjecting the mixture to a temperature of from about 0–10° C. until crystallization substantially ceases, subjecting the resultant slurry to a solids-liquids separation and collecting the resultant separated anhydrous piperazine solids.

2. A method of isolating in anhydrous form the piperazine content of commercial mixtures of ethylene amines containing piperazine, ethylene diamine, ethanol amine, and polyethylene polyamines, which comprises: subjecting the mixture to a temperature of from about 0–10° C. in the presence of piperazine seed crystals until crystallization substantially ceases, subjecting the resultant slurry to a solids-liquids separation and collecting the resultant separated anhydrous piperazine solids.

3. A process according to claim 1 in which the mother liquor from the crystallization step is concentrated to a 20–40% piperazine content by distillation; the concentrate is subjected to the cold-crystallizing and crystal-separating steps of claim 1 and the residual liquid is recycled to the distillation operation.

4. A method of isolating in anhydrous form the piperazine content of commercial mixtures of ethylene amines containing piperazine, ethylene diamine, ethanol amine, and polyethylene polyamines, which comprises: subjecting the mixture to a temperature of from about 0–10° C. in the presence of piperazine seed crystals until crystallization substantially ceases; centifuging the resulting slurry; collecting the separated piperazine solids; distilling the centrifuged liquid up to a temperature of 180° C.; subjecting the fraction boiling at 145–180° C. to a second crystallizing and separating operation; and recycling the residual liquid to a second distillation operation.

THOMAS W. CLAPPER.
ROBERT C. KINSTLER.

No references cited.